United States Patent
Hill

Patent Number: 5,369,864
Date of Patent: Dec. 6, 1994

[54] TOOL KIT FOR ROLLER SKATES
[75] Inventor: Martin H. Hill, Syracuse, N.Y.
[73] Assignee: Built for Speed, Inc., Syracuse, N.Y.
[21] Appl. No.: 68,221
[22] Filed: May 27, 1993
[51] Int. Cl.$^5$ ............................................. B23P 3/00
[52] U.S. Cl. ................................................ 29/271
[58] Field of Search .............. 29/889.07, 271–274, 29/282, 283, 281.5; 269/309, 47, 48.1; 7/167; 206/318, 349

[56] References Cited

U.S. PATENT DOCUMENTS

| | | | |
|---|---|---|---|
| 2,652,620 | 9/1953 | Sutowski | 29/889.07 |
| 4,212,098 | 7/1980 | Sand | 29/271 |
| 4,450,609 | 5/1984 | Hamilton | 206/318 |
| 4,500,079 | 2/1985 | Morghen | 269/309 |
| 4,834,358 | 5/1989 | Okolischan et al. | 269/309 |
| 5,005,814 | 4/1991 | Gumbert | 269/309 |
| 5,065,991 | 11/1991 | Schneider | 269/309 |
| 5,114,006 | 5/1992 | Wilk | 206/349 |

Primary Examiner—Robert C. Watson
Attorney, Agent, or Firm—Staas & Halsey

[57] ABSTRACT

A tool kit includes an assemblage of components for aligning and installing a ball bearing set in a skate wheel. Ball bearing sets conventionally have outer and inner annular bearing races and a central axle hole. The assemblage includes a base having a lower surface and a cylindrical wall defining an upwardly opening cavity in the base. A generally planar, upwardly facing annular shoulder at the top of the wall surrounds the cavity. The assemblage also includes a guide shaft tool mounted in the cavity. The tool includes an elongated guide shaft extending upwardly from the base. The longitudinal axis of the shaft is extends concentrically relative to the shoulder of the base and generally perpendicularly relative to the plane of the shoulder of the base. A collar on the shaft presents another upwardly facing shoulder surrounding the shaft. The shoulders are coplanar, and the shaft and the shoulders are arranged such that when the guide shaft extends through the central axle hole of a set of bearings, the outer and inner bearing races are supported separately by respective annular shoulders to thereby avoid damaging the bearing set during insertion of the same into the bearing hole of a skate wheel. The kit also may include an elongated cylindrical bearing set carrying casing which is mountable on the base to provide a single package to be carried by the user.

8 Claims, 8 Drawing Sheets

FIG. 7
FIG. 9
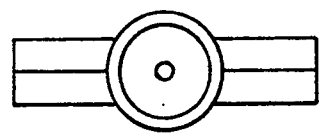
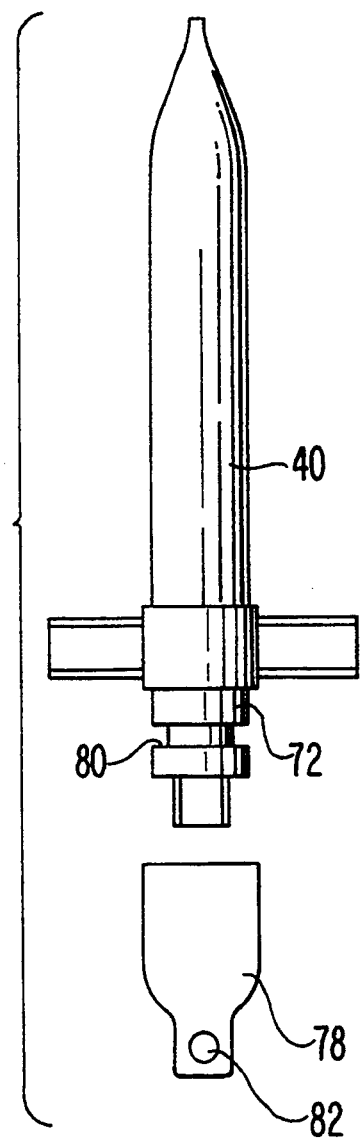
FIG. 8
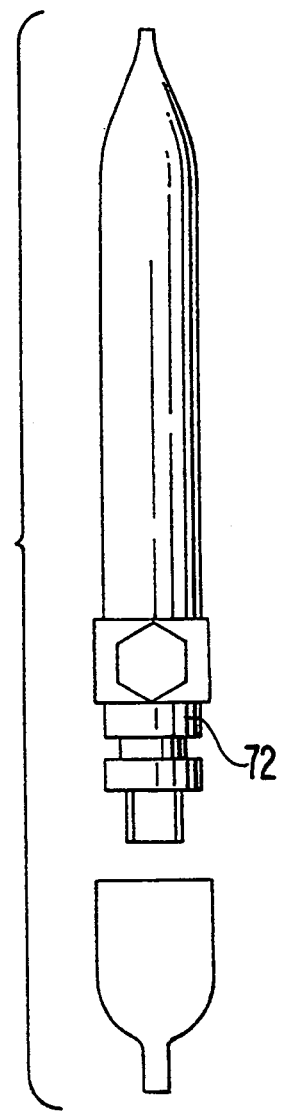

TOOL KIT FOR ROLLER SKATES

BACKGROUND OF THE INVENTION

Field of the Invention

The present invention relates to a tool kit for roller skates and in particular to a tool kit which includes an assemblage of components for aligning and installing ball bearing sets in roller skate wheels.

The Existing Practices and Problems

Bearings for roller skate wheels, and in particular bearings for wheels of in-line roller skates are subject to wear and the accumulation of dust and dirt during operation. Damaged and/or dirty bearings must be removed from time to time for cleaning or replacement. An object of roller skating often involves travel away from one's base station and the need for cleaning or replacement may occur at remote locations. The present invention provides a convenient tool kit facilitating such cleaning and replacement even at remote locations.

SUMMARY OF THE INVENTION

To facilitate cleaning and repair of roller skate bearings the present invention provides a tool kit including an assemblage of components for aligning and installing ball bearing sets in a bearing receiving hole of a wheel. The tool kit of the present invention is utilized in connection with conventional ball bearing sets having outer and inner annular bearing races and a central axle hole. The alignment and installation assemblage includes a base structure having a lower base surface and a peripheral cylindrical wall having an upper end. The wall defines an upwardly opening cavity in the base structure. The wall presents a first generally planar, upwardly facing annular shoulder which surrounds the cavity in the base structure at the upper end of the wall. The alignment and installation assemblage also includes an elongated guide shaft tool mounted in the cavity of the base structure. The guide shaft tool includes an elongated guide shaft which extends upwardly from the base. The guide shaft has a longitudinal axis that is disposed concentrically relative to the first annular shoulder and which extends generally perpendicularly relative to the plane of the first annular shoulder.

The guide shaft is provided with a collar thereon presenting a second generally planar, upwardly facing annular shoulder which surrounds the shaft. The first and second shoulders are co-planar and the shaft and the shoulders are arranged such that when the guide shaft extends through the central axle hole of a set of bearings the first annular shoulder is aligned in supporting relationship with respect to the outer bearing race of the bearing set and the second annular shoulder is aligned in supporting relationship with respect to the inner bearing race of the bearing set.

Preferably the first annular shoulder has an outer cylindrical surface which is sufficiently smaller in diameter than the outer diameter of the bearing set to provide clearance for installing the bearing set in the bearing receiving hole of a roller skate wheel.

In a preferred form of the invention, the tool kit includes an elongated cylindrical bearing set carrying casing having an inner bore which is sufficiently larger in diameter than the outer diameter of the bearing sets for receiving one or more of the latter concentrically in the bore. The casing should be mountable on the base structure with the outer cylindrical surface of the base structure received within the bore.

For maximum utility the guide shaft tool and the base structure should preferably comprise discrete, separable components.

To enhance the utility of the tool kit, the guide shaft may be provided with one or more laterally extending arms in the form of wrench members having hexagonal cross-sectional configurations. To accommodate such laterally extending arms, vertical slots may be provided in the wall to thereby facilitate mounting of the guide shaft tool in the base structure.

BRIEF DESCRIPTION OF THE DRAWINGS

FIG. 7 is a front elevational view illustrating the guide shaft tool of the tool kit of FIGS. 1 and 2 and a carrying cap therefore;

FIG. 8 is a side elevational view of the guide shaft tool and cap of FIG. 7;

FIG. 9 is a top plan view of the guide shaft tool of FIG. 7;

DETAILED DESCRIPTION OF THE PREFERRED EMBODIMENTS

Figure 1:
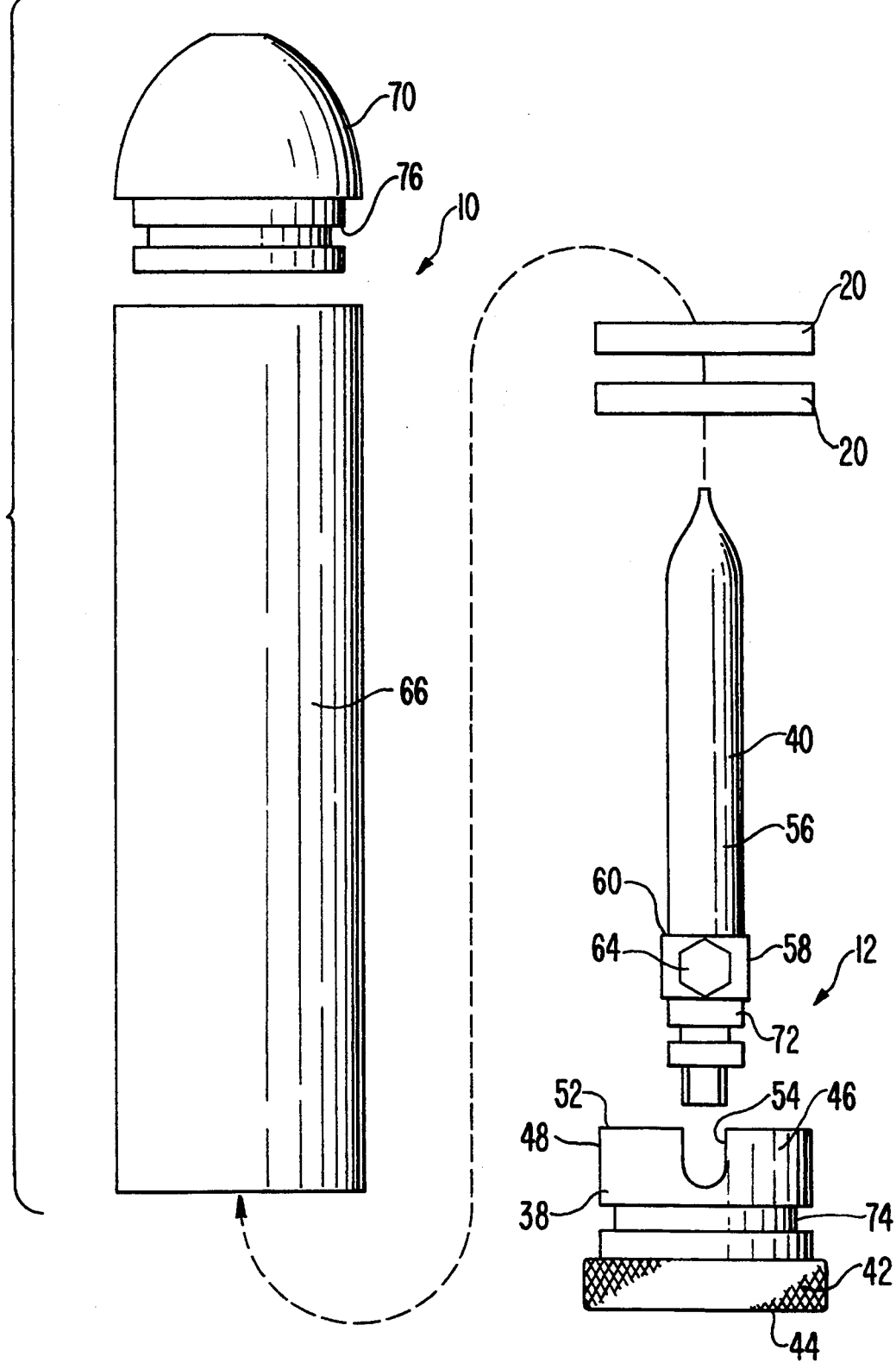
FIG. 1 is an exploded elevational view of a tool kit in accordance with the present invention and which includes an assemblage of components for aligning and installing ball bearing sets in roller skate wheels.
Figure 2:
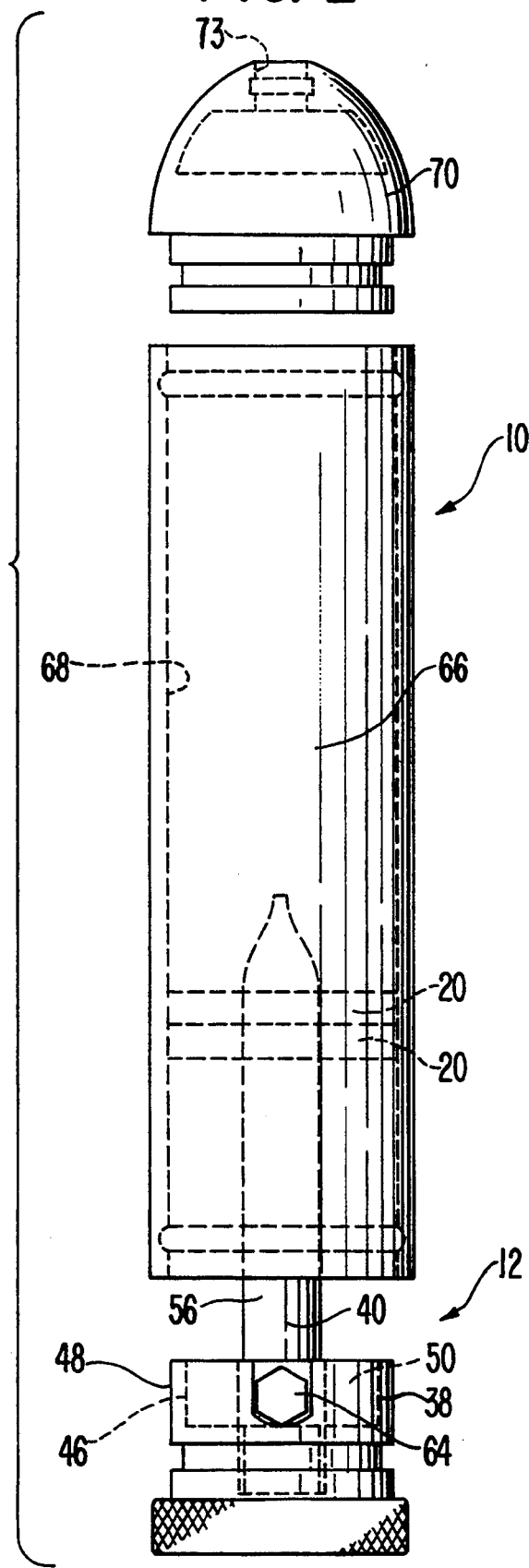
FIG. 2 is an exploded view similar to FIG. 1 except that the components are shown in closer proximity and dashed lines are provided to illustrate internal features.
Figure 3:
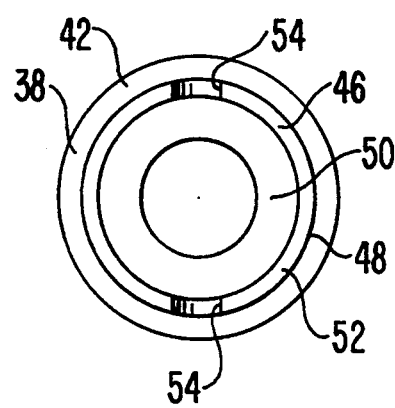
FIG. 3 is a top plan view of the base structure of the tool kit of FIGS. 1 and 2.
Figure 4:
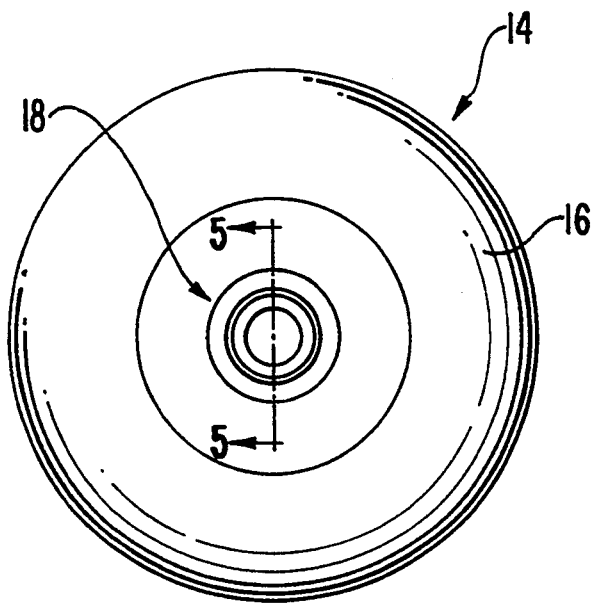
FIG. 4 is a horizontal elevational view of a conventional roller skate wheel.

The present invention provides a tool kit 10 illustrated in FIGS. 1 and 2. The tool kit 10 includes an assemblage of components 12 which is particularly useful for aligning and installing conventional ball bearing sets in skate wheels.

Figure 5:
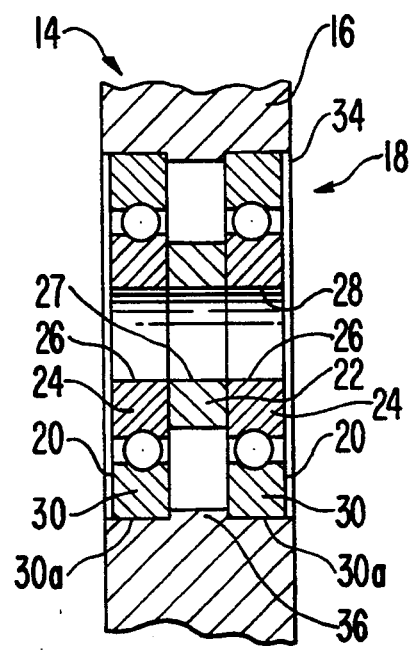
FIG. 5 is an enlarged cross-sectional view taken substantially along the line 5—5 of FIG. 4.

The invention has great utility in connection with a wheel 14 for in-line roller blade skates. The wheel 14 has a surface engagement member 16 formed from a conventional resilient material and a centrally disposed, conventional roller bearing assembly 18. With reference to FIG. 5 it can be seen that the bearing assembly 18 includes a pair of horizontally spaced bearing sets 20 having an annular spacer 22 therebetween. The bearing sets 20 include respective inner races 24, and the arrangement is such that the inner central surfaces 26 of the inner races 24 and the inner surface 27 of the spacer 22 together present a centrally disposed axle receiving hole 28 which extends through the entire bearing assembly 18. The bearing sets 20 also have respective outer races 30 as can be seen from FIG. 5.

The bearing sets 20 are installed within a bearing receiving hole 34 disposed centrally of wheel 14. An annular shoulder 36 is provided internally of bearing receiving hole 34 to facilitate mounting of the bearing sets 20. Thus, as can be seen in FIG. 5, the bearing sets 20 are inserted so that the outer races 30 thereof are in contact with annular shoulder 36 and the bearing sets 20 themselves are disposed in a recessed position relative to the outer surfaces of wheel 14. The outer peripheral surfaces 30*a* of outer races 30 are frictionally engaged with the inner surfaces of hole 34 whereby the bearing sets 20 are held firmly in place during operation, but can be removed for cleaning or replacement.

In accordance with the invention, assemblage 12 includes a base structure 38 and a guide shaft tool 40. Base structure 38 includes a knurled base 42 providing a lower base surface 44. Base structure 38 also includes a peripheral cylindrical wall 46 having an outer cylindrical surface 48. Wall 46 defines an upwardly opening cavity 50 in base structure 38 and presents a generally planar, upwardly facing annular shoulder 52 which surrounds cavity 50 at the upper end of wall 46. A pair of diametrically spaced vertical slots 54 are provided in wall 46 for a purpose to be defined hereinbelow.

Figure 6:
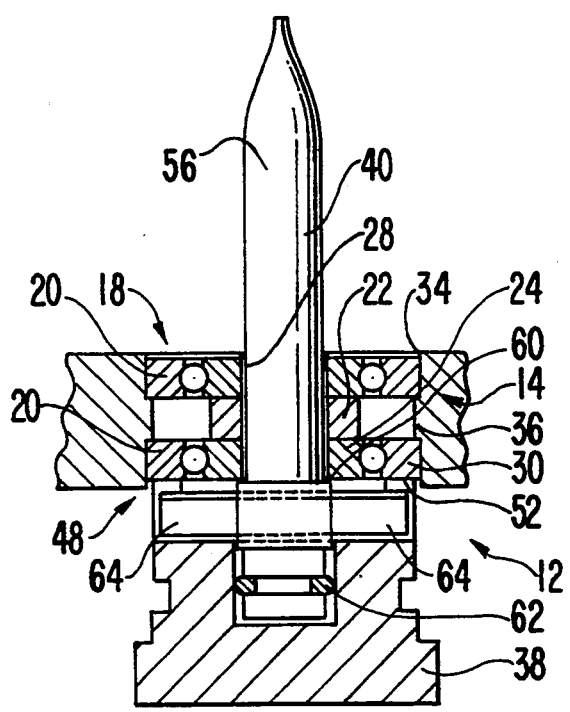
FIG. 6 is a cross-sectional elevational view of the assemblage of components for aligning and installing ball bearings in skate wheels which forms an integral part of the tool kit of FIGS. 1 and 2, and wherein the assemblage of components is illustrated in position for installing a bearing set in a roller skate wheel.

Tool 40 may be mounted in base 38 as illustrated in FIGS. 2 and 6. In particular, in these figures tool 40 is shown as being mounted in cavity 50. Tool 40 includes an elongated guide shaft 56 which extends upwardly from the base 38 when tool 40 and base 38 are joined together in an operational disposition.

In an operational disposition, assemblage 12 is arranged so that surface 44 sits on a generally horizontal surface and guide shaft 56 therefore has a vertically extending longitudinal axis which is disposed concentrically relative to shoulder 52.

Tool 40 is provided with a collar 58 which encircles shaft 56. Collar 58 is concentric with shaft 56 and has a larger diameter. Thus, collar 58 presents a generally planar, upwardly facing annular shoulder 60 which surrounds shaft 56. With reference to FIG. 6, which illustrates the components of assemblage 12 in an operating position, it can be seen that shoulders 52 and 60 are disposed in the same generally horizontal plane. That is to say, shoulders 52 and 60 are co-planar.

Also as can be seen in FIG. 6, an O-ring 62 may be provided so that tool 40 is held snugly in cavity 50 of base structure 38.

FIG. 6 illustrates the operational position of tool 40 and base structure 38 when these components are being utilized for installing a bearing set 20 into the bearing receiving hole 34 of a wheel 14. As can be seen, the outer cylindrical surface 48 of wall 46 is slightly smaller in diameter than the outer diameter of bearing set 20 so as to provide clearance for pushing the bearing set 20 snugly up against the shoulder 36. In this same regard, shaft 56 has an external diameter which is slightly less than the inner diameter of axle hole 28 to facilitate alignment of the bearing sets 20 and the spacer 22. As can be seen, shaft 56 extends through axle hole 28 while shoulder 52 supports outer race 30 and annular shoulder 60 supports inner race 24.

Guide shaft 56 extends perpendicularly relative to the plane of shoulders 52 and 60. Moreover, the inner and outer races 30 and 24 are supported independently by the shoulders 52 and 60, respectively. Accordingly, bearing set 20 may be pushed into hole 34 without any danger of misaligning the inner and outer races and thereby damaging bearing set 20.

Clearly, the bearing set 20 on the opposite side of wheel 14 may be installed in the same manner simply by removing the wheel from shaft 56 and turning the wheel over.

Tool 40 may be provided with one or more laterally extending arms 64 as shown. Arms 64 may preferably be hexagonal in cross-sectional configuration to serve as a Philips type wrench for loosening axle bolts and other skate components. The slots 54 are provided to accommodate arms 64 when tool 40 is mounted in base 38. Thus, as can be seen in the drawings, arms 64 project through slots 54 when the components are assembled in an operational condition. It should also be pointed out in this regard that any mechanical interaction between arms 62 and slots 54 tends to stabilize the position of tool 40 relative to base structure 38.

Kit 10 may also include an elongated, cylindrical bearing set carrying casing 66. Casing 66 has an internal bore 68 which is slightly larger in internal diameter than the outer diameter of the bearing sets. In this latter regard it is pointed out that the length of casing 66 should preferably be sufficient to accommodate a plurality of bearing sets so that a plentiful supply of bearing sets is available when needed.

As can be seen in FIG. 2, bore 68 is designed to receive bearing sets 18 therein with the bearing sets positioned concentrically relative to bore 68. Also, when the various components of the tool are completely assembled as suggested in FIG. 2, shaft 56 will extend through the central axle hole of the bearing sets.

With reference to FIG. 2 in particular, it can be seen that casing 66 is mountable on base 38 with the outer cylindrical surface 48 of wall 46 received concentrically within bore 68. Conveniently, a removable cap 70 may also be provided for keeping bearing sets 20 within bore 68 of casing 66.

With reference to FIG. 5, it can be seen that the right hand bearing set 20 must be removed to the right from hole 34, whereas the left hand bearing set 20 must be removed toward the left, since the shoulder 36 prevents movement of the respective bearing sets in the opposite directions. The spacer 22 is annular and has no support other than from an axle bolt when it is inserted through axle hole 28. When an axle bolt is not inserted in the bearing assembly, spacer 22 is free to move up and down or forward or backward as viewed in FIG. 5. Since shaft 56 of tool 40 has an outer diameter which is only slightly smaller than the inner diameter of axle hole 28, shaft 56 is useful in aligning the axle hole of the spacer 22 with the axle holes of the left and right bearing sets. After alignment, shaft 56 may be withdrawn as an axle bolt is inserted into the axle hole.

In addition to assisting in the alignment of the axle hole of the spacer 22 with the axle holes of the left and right bearing sets 20, the shaft 56 of the tool 40 is also useful in maintaining the relative positions of the bearing sets 20 and the spacer 22 as the bearing sets 20 are pushed tightly into the central wheel hole 34, as explained above, so that the bearing sets 20 are snugged up tightly against the side of shoulder 36 as shown in FIGS. 5 and 6.

The end 72 of tool 40 may be used to extract a bearing set 20 from the wheel hole 34. In this regard, the end 72 may be inserted into the axle hole 26 and a lateral force may be applied to shaft 56 to increase friction between end 72 and the interior of axle hole 26. An outward pull on shaft 56 may then dislodge the bearing set from bearing hole 34.

It will be appreciated by those of ordinary skill in the art to which the present invention pertains that appropriate grooves may be provided in the various components to facilitate suitable O-rings for frictionally holding the various components in position relative to one another. Thus, to keep base component 38 within casing 66, an O-ring may be used in groove 74. Similarly, an O-ring may be used in groove 76 of cap 70.

Figure 10:
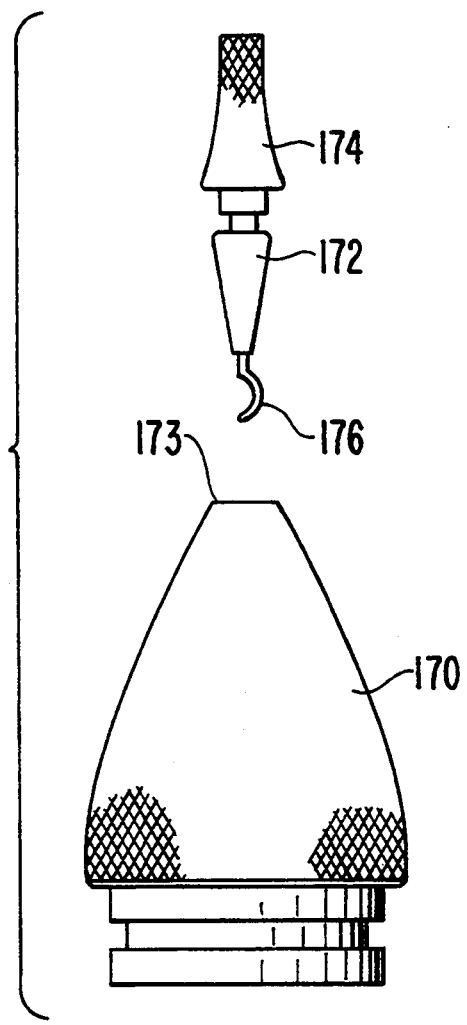
FIG. 10 is an exploded elevational view illustrating an alternative cap component and stinger element for the tool kit of FIG. 1.

An alternative cap component 170 is illustrated in FIG. 10. As shown, cap 170 may be provided with a knurled outer surface to facilitate handling. A stinger 172 may be mounted within an appropriate hole 173 provided in cap 170. Stinger 172 includes a hook 176 which is useful for removing dust rings from roller bearing sets as is known to those of ordinary skill in the art to which the present invention pertains. A knurled knob 174 may be provided to facilitate handling of stinger 172.

Figure 11:
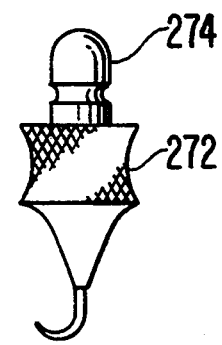
FIG. 11 is an elevational view illustrating an alternative stinger element which is useful in connection with the invention.
Figure 15:
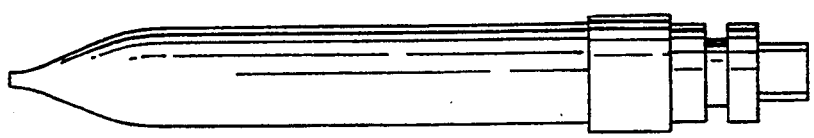
FIGS. 12 through 18 are elevational views illustrating alternative shaft tools useful in connection with the invention.
Figure 14:
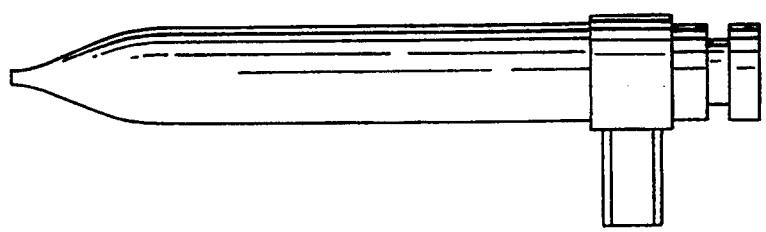
Figure 13:
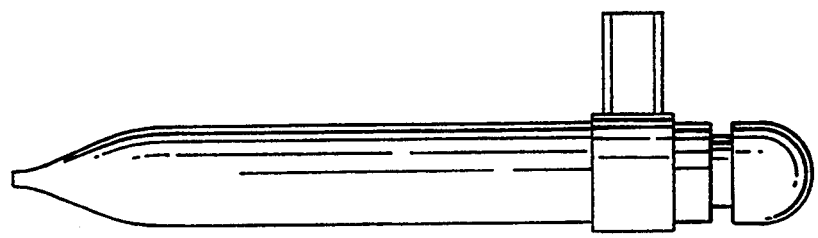
Figure 12:
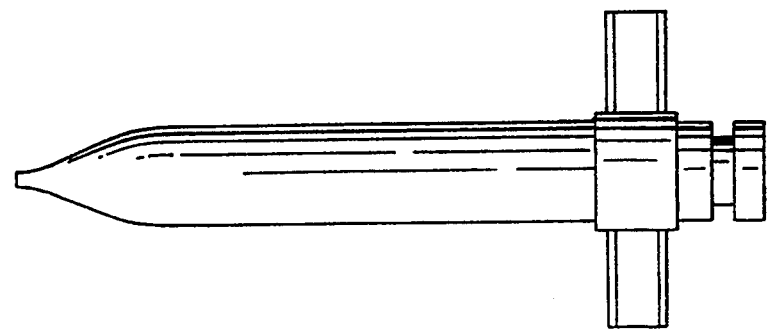
Figure 17:
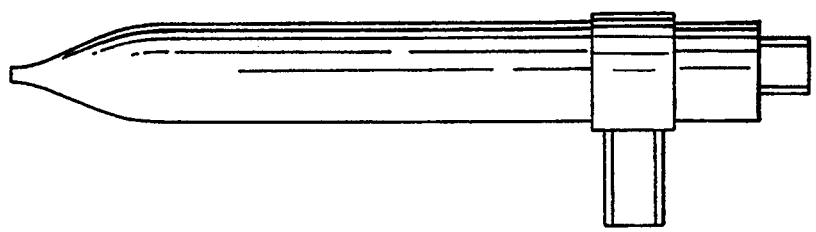
Figure 16:
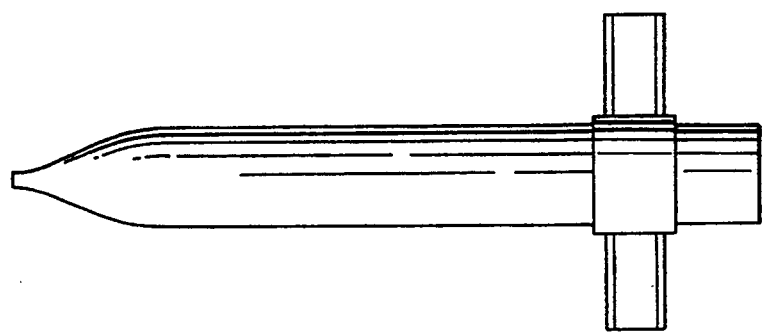
Figure 18:
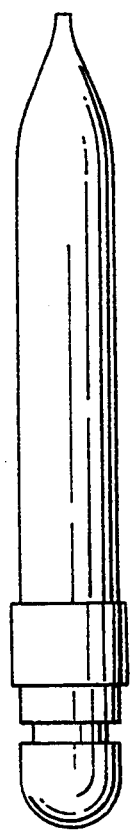

An alternative stinger 272 is illustrated in FIG. 11. Stinger 272 includes a shaft 274 which may be received within hole 173 of cap 170 or hole 73 of cap 70. In this latter regard, shaft 274 may be inserted into hole 73 either from above or below. If stinger 272 is mounted in hole 73 from above, the shaft of casing 66 provides a handle to facilitate the use of stinger 272. On the other hand, shaft 274 may be inserted into hole 73 from below when the stinger tool is not being used.

With reference to FIGS. 7, 8 and 9, a cap 78 is provided for end 72 of tool 40. An O-ring may be utilized in groove 80 to keep cap 78 in place and a hole 82 is provided in cap 78 for receiving a chain so that the tool 40 may be carried as a necklace during a skating exercise.

FIGS. 12 through 18 illustrate different configurations for tool 40 which are useful in connection with the present invention. These various configurations are essentially equivalent for purposes of operation to those described above. Needless to say, those configurations which present more than one hexagonally shaped arm may be modified so that the arms have different dimensions to accommodate fasteners with different sized wrench sockets.

Figure 19:
FIGS. 19 and 20 are alternative guide shaft tools useful in connection with roller skate wheels wherein the bearings have a small central axle hole.
Figure 20:

FIGS. 19 and 20 illustrate tools similar to tool 40 except that these tools are designed for use in connection with bearing sets having smaller axle holes.

I claim:

1. A tool kit including an assemblage of components for aligning and installing a ball bearing set in a bearing receiving hole of a wheel, said ball bearing set having outer and inner annular bearing races and a central axle hole, said assemblage comprising:

a base structure having a lower base surface and a peripheral cylindrical wall having an upper end, said wall defining an upwardly opening cavity in said base structure and presenting a first generally planar, upwardly facing annular shoulder surrounding said cavity at said upper end thereof, said wall having concentric inner and outer cylindrical surfaces and a predetermined radial thickness such that said first shoulder has a width that is less than a radial width of an outer bearing race; and a guide shaft tool mounted in said cavity and including an elongated guide shaft extending upwardly from said base structure, said guide shaft having a longitudinal axis which extends concentrically relative to said first annular shoulder and generally perpendicularly relative to the plane of said first shoulder, said guide shaft having a collar thereon presenting a second generally planar, upwardly facing annular shoulder surrounding said shaft, said first and second shoulders being generally co-planar, said shaft and said shoulders being arranged such that when the guide shaft extends through the central axle hole of a set of bearings, the first annular shoulder is aligned in supporting relationship with respect to the outer bearing race and the second annular shoulder is aligned in supporting relationship with respect to the inner bearing race.

2. A tool kit as set forth in claim 1, wherein said outer cylindrical surface is sufficiently smaller in diameter than the outer diameter of a bearing set to provide clearance for installing the bearing set in a bearing receiving hole of a wheel.

3. A tool kit including an assemblage of components for aligning and installing a ball bearing set in a bearing receiving hole of a wheel, said ball bearing set having outer and inner annular bearing races and a central axle hole, said assemblage comprising:

a base structure having a lower base surface and a peripheral cylindrical wall having an upper end, said wall defining an upwardly opening cavity in said base structure and presenting a first generally planar, upwardly facing annular shoulder surrounding said cavity at said upper end thereof, said wall having concentric inner and outer cylindrical surfaces and a predetermined radial thickness such that said first shoulder has a width that is less than a radial width of an outer bearing race; and a guide shaft tool mounted in said cavity and including an elongated guide shaft extending upwardly from said base structure, said guide shaft having a longitudinal axis which extends concentrically relative to said first annular shoulder and generally perpendicularly relative to the plane of said first shoulder, said guide shaft having a collar thereon presenting a second generally planar, upwardly facing annular shoulder surrounding said shaft, said first and second shoulders being generally co-planar, said shaft and said shoulders being arranged such that when the guide shaft extends through the central axle hole of a set of bearings, the first annular shoulder is aligned in supporting relationship with respect to the outer bearing race and the second annular shoulder is aligned in supporting relationship with respect to the inner bearing race, wherein said wall has an outer cylindrical surface which is sufficiently smaller in diameter than the outer diameter of a bearing set to provide clearance for installing the bearing set in a bearing receiving hole of a wheel, and wherein is included an elongated cylindrical bearing set carrying casing having an inner bore which is sufficiently larger in diameter than the outer diameter of a bearing set for receiving one or more of the latter concentrically in said bore, said casing being mountable on said base structure with said outer cylindrical surface received within said bore.

4. A tool kit as set forth in claim 1, wherein said guide shaft tool and said base structure are discrete, separable components.

5. A tool kit as set forth in claim 4, wherein said wall has an outer cylindrical surface which is sufficiently smaller in diameter than the outer diameter of a bearing set to provide clearance for installing the bearing set in a bearing receiving hole of a wheel.

6. A tool kit including an assemblage of components for aligning and installing a ball bearing set in a bearing receiving hole of a wheel, said ball bearing set having outer and inner annular bearing races and a central axle hole, said assemblage comprising:
- a base structure having a lower base surface and a peripheral cylindrical wall having an upper end, said wall defining an upwardly opening cavity in said base structure and presenting a first generally planar, upwardly facing annular shoulder surrounding said cavity at said upper end thereof, said wall having concentric inner and outer cylindrical surfaces and a predetermined radial thickness such that said first shoulder has a width that is less than a radial width of an outer bearing race; and
- a guide shaft tool mounted in said cavity and including an elongated guide shaft extending upwardly from said base structure, said guide shaft having a longitudinal axis which extends concentrically relative to said first annular shoulder and generally perpendicularly relative to the plane of said first shoulder, said guide shaft having a collar thereon presenting a second generally planar, upwardly facing annular shoulder surrounding said shaft, said first and second shoulders being generally co-planar, said shaft and said shoulders being arranged such that when the guide shaft extends through the central axle hole of a set of bearings, the first annular shoulder is aligned in supporting relationship with respect to the outer bearing race and the second annular shoulder is aligned in supporting relationship with respect to the inner bearing race, wherein said guide shaft tool and said base structure are discrete, separable components, wherein said wall has an outer cylindrical surface which is sufficiently smaller in diameter than the outer diameter of a bearing set to provide clearance for installing the bearing set in a bearing receiving hole of a wheel, and wherein is included an elongated cylindrical bearing set carrying casing having an inner bore which is sufficiently larger in diameter than the outer diameter of a bearing set for receiving one or more of the latter concentrically in said bore, said casing being mountable on said base structure with said outer cylindrical surface received within said bore.

7. A tool kit including an assemblage of components for aligning and installing a ball bearing set in a bearing receiving hole of a wheel, said ball bearing set having outer and inner annular bearing races and a central axle hole, said assemblage comprising:
- a base structure having a lower base surface and a peripheral cylindrical wall having an upper end, said wall defining an upwardly opening cavity in said base structure and presenting a first generally planar, upwardly facing annular shoulder surrounding said cavity at said upper end thereof; and
- a guide shaft tool mounted in said cavity and including an elongated guide shaft extending upwardly from said base structure, said guide shaft having a longitudinal axis which extends concentrically relative to said first annular shoulder and generally perpendicularly relative to the plane of said first shoulder, said guide shaft having a collar thereon presenting a second generally planar, upwardly facing annular shoulder surrounding said shaft, said first and second shoulders being generally co-planar, said shaft and said shoulders being arranged such that when the guide shaft extends through the central axle hole of a set of bearings, the first annular shoulder is aligned in supporting relationship with respect to the outer bearing race and the second annular shoulder is aligned in supporting relationship with respect to the inner bearing race, wherein said guide shaft tool and said base structure are discrete, separable components, and wherein a vertical slot is provided in said wall, said guide shaft including a laterally extending arm which projects through said slot.

8. A tool kit as set forth in claim 7, wherein said arm comprises a wrench member having a hexagonal cross-sectional configuration.

* * * * *